United States Patent
Lambert

(10) Patent No.: US 7,286,051 B2
(45) Date of Patent: Oct. 23, 2007

(54) PROVIDING AUDIO INDICATIONS REMOTELY

(75) Inventor: Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 10/965,252

(22) Filed: Oct. 14, 2004

(65) Prior Publication Data

US 2006/0095224 A1    May 4, 2006

(51) Int. Cl.
G08B 1/00    (2006.01)
G08B 29/00   (2006.01)

(52) U.S. Cl. .............. 340/531; 340/514; 340/516; 714/36

(58) Field of Classification Search ........... 340/531, 340/635, 514, 384.1, 384.5, 384.7, 384.73, 340/516, 692; 714/48, 57, 36; 702/122, 702/57
See application file for complete search history.

(56) References Cited

U.S. PATENT DOCUMENTS

| 5,535,330 | A  | * | 7/1996  | Bell ........................... 714/36 |
| 5,815,652 | A  | * | 9/1998  | Ote et al. ................... 714/31 |
| 6,393,586 | B1 | * | 5/2002  | Sloan et al. ................. 714/25 |
| 6,687,854 | B1 |   | 2/2004  | Liu ............................ 714/25 |
| 6,731,206 | B2 |   | 5/2004  | Yang et al. ................. 340/500 |
| 6,963,998 | B2 | * | 11/2005 | Owhadi ...................... 714/46 |
| 2006/0005070 | A1 | * | 1/2006 | Zimmer et al. .............. 714/5 |

OTHER PUBLICATIONS

Nguyen, Dung; *Dell Remote Access Card (DRAC) III Console Redirection*, Dell Enterprise Systems, 17 pages, Mar. 2002.

* cited by examiner

*Primary Examiner*—Toan N. Pham
(74) *Attorney, Agent, or Firm*—Baker Botts L.L.P.

(57) ABSTRACT

Audible status indications available at a local information handling system, e.g. beep codes, are used to notify a remote information handling system of the local information handling system's status. The remote information handling system then generates a visual or audible indication of the local information handling system's status.

25 Claims, 2 Drawing Sheets

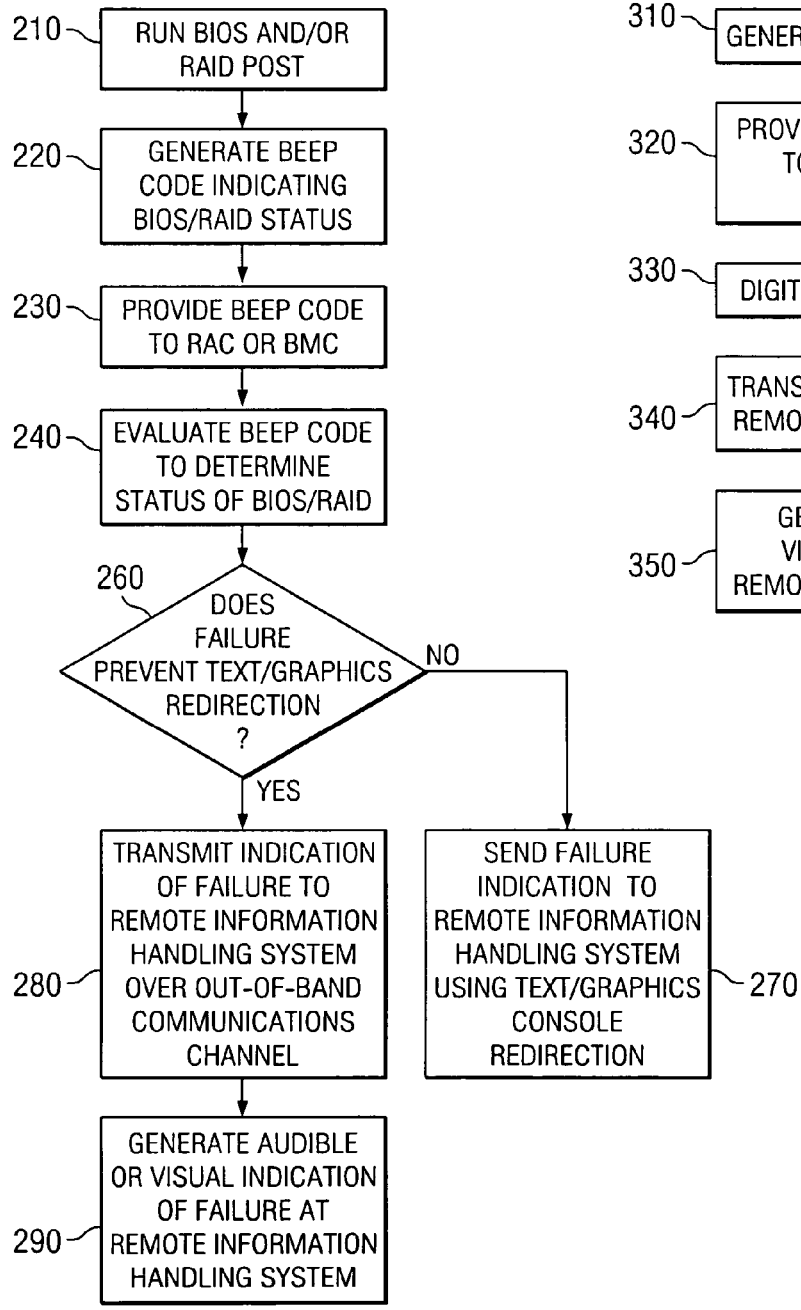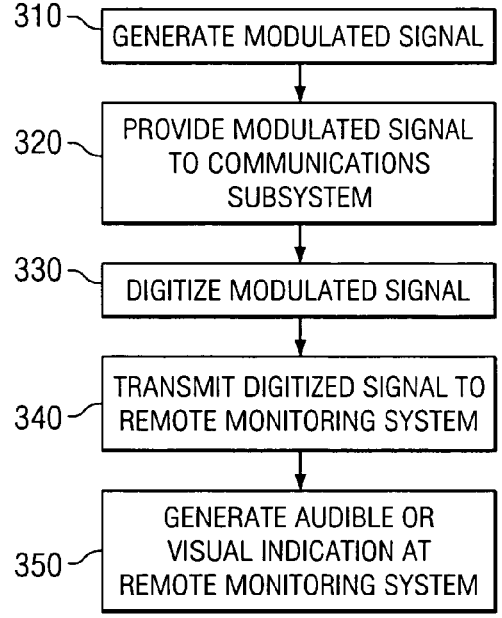

PROVIDING AUDIO INDICATIONS REMOTELY

TECHNICAL FIELD

This disclosure relates generally to audio indicators, such as beep codes generated during a power on self test (POST), and more particularly to providing audio indicators remotely.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most information handling systems include a basic input/output system (BIOS) that includes test capabilities, to determine the functionality of critical subsystems. Some information handling systems may include technologies that allow users to remotely observe the progress of certain tests by redirecting text or graphics to a serial text or graphics console. In effect, text and graphics consoles allow text or graphics messages which would otherwise be displayed locally on the information handling system being tested, to be displayed on a remote information handling system.

For some failures, e.g. failures detected during early portions of a power-on self test (POST), however, no text or graphics display is generated. For instance, failures that cause the information handling system to stop responding before video is queued, or before serial text generation is enabled, do not normally cause text or graphics to be generated. Instead, these types of failures are most often indicated by generating a pattern of audible tones, commonly referred to as a beep code. Based on the beep code, a user can determine which portion of the POST failed.

SUMMARY

In accordance with teachings of the present disclosure, a system and method are described for providing a local information handling system's status, which is normally indicated by a locally generated audible signal, to a remote information handling system.

In at least one embodiment, a modulated signal configured to be provided to a speaker for generating a beep code is provided to a communications subsystem, e.g. a Remote Access Card (RAC) or Baseboard Management Controller (BMC). The communications subsystem evaluates the signal to determine the status of the information handling system, and transmits an indication of that status to a remote information handling system.

The remote system may use the status indication to generate an audible or visual indication of the status, for example by flashing an icon on a graphical user interface or re-creating the audible beep code. In this way, a beep code generated by a first information handling system may be used to notify a second information handling system of the status of the first information handling system, even if first information handling system has stopped responding prior to text or graphics console redirection being enabled.

In some embodiments, a method according to the present disclosure is implemented by a computer readable medium embodying a program of instructions. Other embodiments take the form of an information handling system including a processor, a chipset that generates a modulated signal indicating a status of the information handling system, and a communications subsystem that determines the status indicated by the modulated signal and communicates that status to a remote information handling system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2 and 3 are flow diagrams illustrating methods of providing a signal configured to produce an audible indication of a test result to a remote information handling system according to embodiments of the present disclosure.

DETAILED DESCRIPTION

Figure 1:
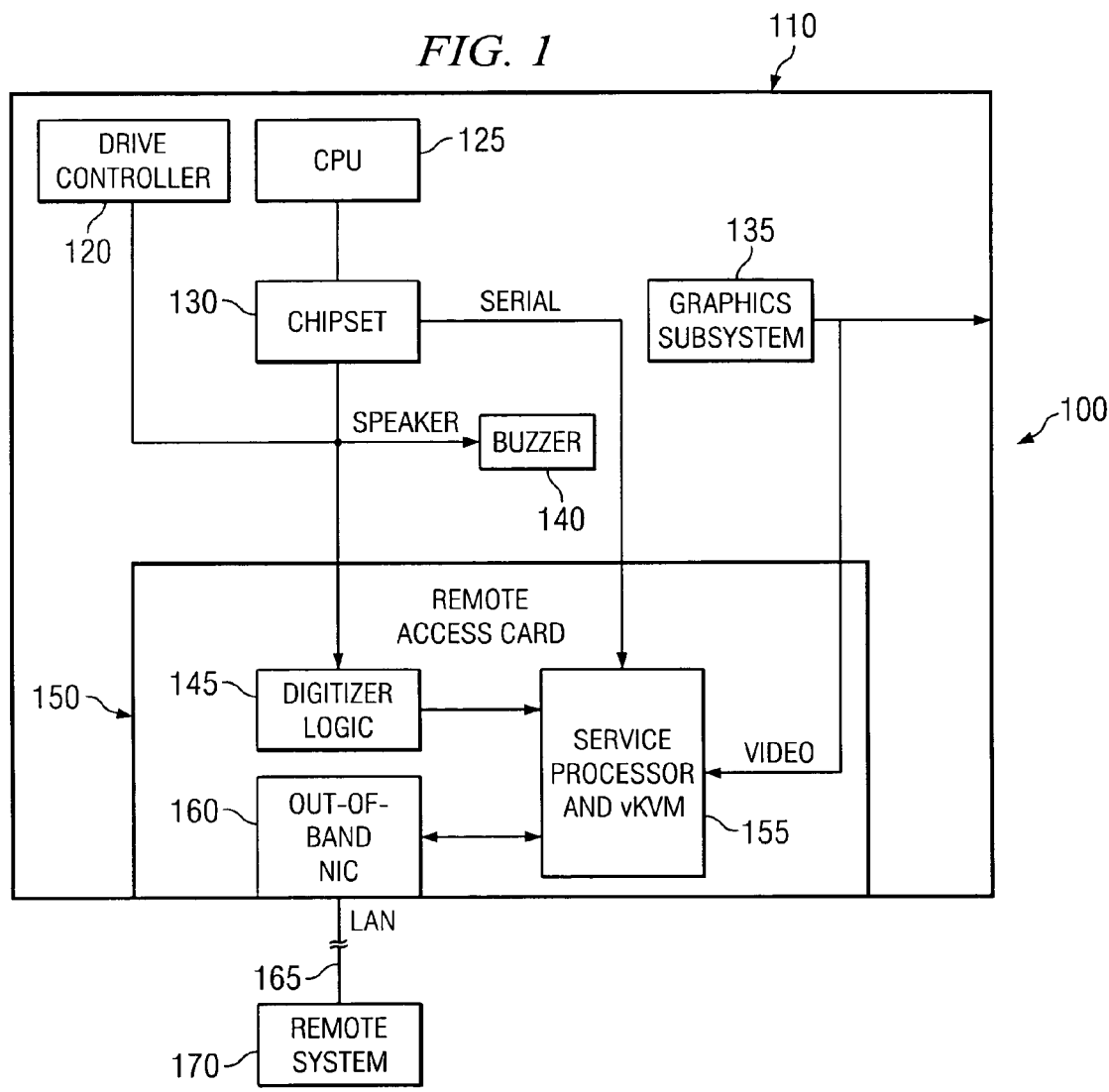
FIG. 1 is a block diagram of an information handling system that provides a signal configured to produce an audible indication of a power on self test to a second information handling system according to an embodiment of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring first to FIG. 1, a network of information handling systems according to an embodiment of the present disclosure will be discussed. Network 100 includes local information handling system 110 connected to remote system 170 via local area network (LAN) 165. Local information handling system 110 and remote system 170 may be one of various types of information handling systems, such as those discussed previously. In one embodiment, for example, local information handling system 110 may be a server, while remote system 170 may be a desktop or portable information handling system, or another server. Further in some embodiments, remote system 170 may be dedicated to monitoring the status of one or more information handling systems including local information handling system 110.

In at least one embodiment, local information handling system 110 is one of multiple servers, e.g. a blade server, located in a single equipment enclosure or rack. In other embodiments, local information handling system 110 is a desktop, laptop, handheld, or some other similar computer system operating essentially independently of remote system 170, which may also be a desktop, laptop, handheld, server or other type of information handling system. Although the terms local and remote are used herein, it should be appreciated that local information handling system 110 and remote system 170 may be co-located in a common physical facility, room, or equipment enclosure.

In the illustrated embodiment, local information handling system 110 includes a drive controller 120, e.g. a redundant array of independent drives (RAID) on mother board (ROMB), a central processing unit (CPU) 125, chipset 130, a speaker, such as buzzer 140, and a graphics subsystem 135, such as VGA. Local information handling system 110 also includes remote access card (RAC) 150, which provides out of band signaling and communications between remote system 170 and local information handling system 110.

Remote access card 150 includes, in at least one embodiment, digitizer logic 145, service processor and virtual keyboard/video/mouse processor (vKVM) 155, and out-of-band network interface connection (NIC) 160.

Chipset 130, in at least one embodiment, includes a basic input/output system (BIOS) that provides instructions to CPU 125 for performing a series of self tests of individual subsystems upon initial power-up of local information handling system 110. In at least one embodiment, early portions of the power on self test (POST) verify the operation of various input/output capabilities of information handling system 110.

For example, VGA subsystem 135, which provides graphical interface capabilities for local information handling system 110, may be tested early in the POST. Early portions of the POST may also initialize vKVM functions of RAC 150. By establishing graphics or vKVM functionality early in the POST, information handling system 110 is assured of being able to relay information about the results of the POST to a user.

If, however, the post test fails before the graphics or vKVM functionality has been established, chipset 130 may be limited to providing self test indications through a local speaker, such as buzzer 140, or through some similar indicator local to information handling system 110.

In such a case, chipset 130 generally generates a series of beep codes to provide an indication of self test results, allowing a user to determine the status of the information handling system without using graphics or text input/output devices. For example, if BIOS chipset 130 fails a memory test portion of the self test, then BIOS chipset 130 may generate three short beeps. If a second CPU cache portion of the self test fails, then BIOS chipset 130 may generate a second beep code consisting of a single long beep followed by two short beeps.

It should be appreciated that in addition to a number of beeps, the frequency/tone of the beeps, the pattern of the beeps and pauses therebetween, or the like, may be used to establish unique beep codes that are associated with different statuses of particular portions of the POST. Furthermore, although the above example focuses on beep codes generated as a result of a POST, the principles of the present disclosure also encompass audible status indications generated at times other than during a POST.

ROMB 120 may also perform certain self tests, upon initial power up or otherwise, and generated beep codes indicating various different failure modes, and/or statuses. Like chipset 130, ROMB 120 may provide these beep codes to buzzer 140.

In some cases, however, information handling system 110 may not be provided with a buzzer 140. Additionally, even if local information handling system 110 does include a speaker or other audible signaling device, local information handling system 110 may be located where audible indications cannot be observed. If, for example, information handling system 110 is one of multiple servers located in an unattended server room, any audible indications generated by ROMB 120 or chipset 130 may go unnoticed. Environmental conditions, such as noise from equipment fans or alarms generated by other equipment may also prevent audible indications from being heard. Under these circumstances, and many others, it would be advantageous to provide a beep code generated by information handling system 110 to remote system 170, so that remote system 170 can be used to monitor the status of local information handling system 110.

In at least one embodiment, therefore, modulated signals provided to buzzer 140, either by ROMB 120 or BIOS chipset 130, are routed not only to buzzer 140, but also to a RAC 150 or to a BMC (not illustrated). In one such embodiment, signals destined for buzzer 140 are also provided to digitizer logic 145, which captures the duration and pattern of the beeps and transcribes them into pitch and beep durations. The pitch and beep durations may be compared against a lookup table of beep codes so that the RAC can determine, based on the beep code, what failures or other status indicators are indicated. The remote access card may then provide an indication of the status of the power on self test to remote system 170 via out of band NIC 160.

In some embodiments, the indication provided to remote system 170 may be a digitized version of the beep code. In other embodiments, the indication provided to remote system 170 is a signal generated in response to comparing the signal generated by digitizer logic 145 with beep code meanings in a lookup table.

The indication provided by local information handling system 110 may be received at remote system 170 using software plugins and applets used to control and observe information handling system 110. Remote system 170 can then use software, e.g. a browser plug-in, or other suitable software and/or hardware to convert the received indication to text, graphics, or some other suitable display object or group of objects. This display object can be used to provide a user of remote system 170 with a visual indication of the status of local information handling system 110. In some embodiments, remote system 170 uses the signal received from local information handling system 110 to recreate the audible beep code that would have been generated by buzzer 140.

Referring next to FIG. 2, a method according to an embodiment of the present disclosure will be discussed. Method 200 begins by initiating a BIOS and/or a RAID power on self test (POST) at 210. At 220 the method generates a modulated signal, e.g. a beep code, configured to drive a speaker to produce an audible indication of the status of the BIOS and/or RAID POST. In at least one embodiment, the beep code has specific frequencies, duty cycles, pulse widths, amplitudes, or other characteristics that enable the beep code to be associated with a particular functional status of one or more subsystems of the information handling system.

The beep code is provided to interface circuitry, such as a remote access card (RAC) or baseboard management controller (BMC) at 230. In other embodiments (not illustrated), the beep signal or code is provided to a speaker in addition to being provided to the RAC or BMC.

At 240 the interface circuitry analyzes the beep code to determine the status of the BIOS or RAID. In at least one embodiment, the analysis includes digitizing the modulated beep code signal to generate a digital version of the beep code. The digital version of the beep code is compared with a table of beep code meanings to determine the status of the information handling system.

At 260 method 200 determines whether the status of the information handling system, as indicated by the beep code, prevents the status from being communicated to a remote information handling system using text or graphic redirection. If the beep code indicates that graphics or text redirection is unavailable, the method proceeds to 280, and transmits an indication of the status of the information handling system to a remote system using an out of band communications channel.

At least one embodiment of the present disclosure sends the remote system a modified digital signal indicating the status of the local information handling system. For example, if a particular information handling system recognizes six possible failure modes that may prevent text and graphics redirection from being used, then the modified digital signal provided to the remote system may include a three bit signal representing an octal value between zero and seven, with each value corresponding to a particular one of the six possible failure modes. Other, similar signal representations may be generated using well known techniques, without departing from the spirit and scope of the present disclosure. In other embodiments, a digital version of the beep code may be transferred to the remote system.

If the beep code indicates that text and graphics redirection is available, the method proceeds to 270, where an indication of the local information handling system is sent to the remote information system using text or graphics console redirection. Text and/or graphics redirection, and the use of text or graphics consoles, is well know to those skilled in the art.

At 290 the remote system generates an audible or visual indication of the status of the local information handling system. The visual indication may include text messages, popup windows, flashing icons, illuminated status lamps, or various other visual indications generated by either hardware or software.

In at least one embodiment, the indication received at the remote information handling system is used to reproduce the audible indication generated at the local information handling system. For example, if the beep code generated by the BIOS or RAID consisted of a sequence of two short beeps and one long beep repeated three times, the remote system would generate an audible signal having two short beeps and one long beep, and repeat that sequence three times.

Referring next to FIG. 3, another method according to an embodiment of the present disclosure is discussed. Method 300 begins at 310 by generating a modulated signal configured to be provided to a transducer, e.g. a speaker, to produce an audible indication of the status of a local information handling system. The modulated signal may be produced at any time, including during a boot process, while running applications that produce audio output, during run-time, etc. Such a modulated signal may be produced in response to a POST test, a keyboard overrun, failure of a RAID array, or some other event affecting or indicating the status of the local information handling system.

Method 300 proceeds to 320, where the modulated signal is provided to a communications subsystem, such as a BMC, an RAC, or the like. The communications subsystem digitizes the modulated signal at 330, and provides the digitized signal to a remote monitoring system at 340. In at least one embodiment, the modulated signal is provided to the remote monitoring subsystem in an undigitized format.

In at least one embodiment, the modulated/digitized signal may be transmitted to the remote monitoring system using a sideband of network communication channel. By transmitting the modulated/digitized signal over a sideband, status signals can be transmitted without interfering with normal network communications.

After receiving the modulated/digitized signal, the remote monitoring system may generate an audible or visual status indication at 350.

Although methods 200 and 300 discussed above with reference to FIGS. 2 and 3, respectively, are described as being performed in a particular order, some embodiments may be implemented by performing the same actions in a different sequence, or by performing fewer or additional actions. For example, if a particular local information handling system is not equipped for text and graphics redirection, then actions 260 and 270 (FIG. 2) may not be performed. Additionally, functionality described herein as being performed by chipset 130 (FIG. 1) may instead be performed by CPU 125, or otherwise.

Furthermore, self tests other than BIOS or RAID tests may be performed either as part of a POST, or after the local information handling system is operational. Additionally, alarm conditions or other audible indications, even those not generated as a result of a self test, may be delivered to a remote system using the teachings set forth herein.

Although the disclosed embodiments have been described in detail, it should be understood that various changes, substitutions and alterations can be made to the embodiments without departing from their spirit and scope.

What is claimed is:

1. A method comprising:
    generating a speaker signal, said speaker signal indicating a status of a first information handling system;
    providing the speaker signal to a communications subsystem configurable to communicate signals to a second information handling system; and
    transmitting signal information indicative of the speaker signal to the second information handling system via a network interface card of the communication subsystem.

2. The method of claim 1, wherein said generating occurs during performance of a power-on self test (POST) of the first information handling system; and wherein generating the speaker signal comprises generating a beep code to indicate a result of the POST.

3. The method of claim 1, wherein transmitting said signal information to the second information handling system comprises transmitting via an out-of-band communications channel.

4. The method of claim 1, further comprising evaluating the signal to determine the status of the first information handling system.

5. The method of claim 4, wherein the evaluating comprises evaluating a characteristic of the signal.

6. The method of claim 5, wherein the characteristic is selected from the group consisting of an amplitude, a duty cycle, a pulse width, a pulse pattern, a signal duration, and a pulse frequency.

7. The method of claim 4, further comprising comparing a result of the evaluating with contents of a lookup table to determine a status code.

8. The method of claim 4, further comprising transmitting a result of the evaluation to the second information handling system.

9. The method of claim 8, further comprising:

digitizing the speaker signal to generate a digitized version of the speaker signal; and transmitting the digitized version of the speaker signal to the second information handling system.

10. The method of claim 8, further comprising generating an audible indication at the second information handling system, the audible indication indicating the result of the evaluation.

11. The method of claim 8, further comprising generating a visual indication at the remote monjtor, the visual indication indicating the result of the evaluation.

12. An information handling system comprising:

a processor;

a chipset coupled to said processor and operable to produce a speaker signal indicating a status of the information handling system; and a communications subsystem coupled to receive said speaker signal and to communicate the speaker signal to a remote information handling system.

13. The information handling system of claim 12, wherein the chipset comprises a basic input/output system (BIOS).

14. The information handling system of claim 12, wherein the communications subsystem is configured to digitize the speaker signal; and communicate the digitized signal to the remote information handling system.

15. The information handling system of claim 12, wherein said communications subsystem comprises a remote access card.

16. The information handling system of claim 12, wherein said communications subsystem comprises a baseboard management controller.

17. The information handling system of claim 12, wherein:

said chipset comprises a program of instructions configured to perform a power-on self test (POST); and said speaker signal comprises a beep code indicating a result of the POST.

18. The information handling system of claim 12, wherein said communications subsystem comprises a lookup table to associate a characteristic of the speaker signal with a code indicating the status of the information handling system.

19. The information handling system of claim 12, further comprising a RAID controller coupled to said communications subsystem, said RAID controller including a program of executable instructions to generate an indicator signal associated with a result of a POST, and to provide a modulated signal indicating a status of the information handling system to said communications subsystem.

20. A computer readable medium tangibly embodying a computer program of instructions, said program of instructions comprising:

at least one instruction to determine the status of a first information handling system;

at least one instruction to generate a speaker signal configured to produce an audible indication of the status of the first information handling system; and at least one instruction to provide the speaker signal to an out of band communication subsystem of the first information handling system.

21. The computer readable medium of claim 20, wherein the speaker signal comprises a beep code indicating a result of a power-on self test (POST).

22. The computer readable medium of claim 20, further comprising at least one instruction to digitize the speaker signal.

23. The computer readable medium of claim 20, wherein the at least one instruction to determine a status comprises at least one instruction to determine the status of the information handling system based on a characteristic of the speaker signal selected from the group consisting of an amplitude, a duty cycle, a pulse width, a pulse pattern, a duration of the signal, and a pulse frequency.

24. The computer readable medium of claim 20, wherein the at least one instruction to determine a status further comprises at least one instruction to determine the status of the information handling system based on contents of a lookup table.

25. The computer readable medium of claim 20, wherein the at least one instruction to provide an indication comprises at least one instruction to transmit the indication using an out-of-band communications channel.

* * * * *